United States Patent [19]

Sanders, Jr. et al.

[11] 3,925,160

[45] Dec. 9, 1975

[54] METHOD OF PRODUCING AN ANTIBIOTIC

[75] Inventors: W. Eugene Sanders, Jr.; Christine C. Sanders, both of Omaha, Nebr.

[73] Assignee: Creighton University, Omaha, Nebr.

[22] Filed: Sept. 26, 1974

[21] Appl. No.: 509,457

[52] U.S. Cl. ................................................ 195/96
[51] Int. Cl.² ........................................ C12D 9/20
[58] Field of Search .................................... 195/96

[56] References Cited
UNITED STATES PATENTS
3,786,141  1/1974  Ogawa et al. ........................ 195/96

*Primary Examiner*—Lionel M. Shapiro
*Attorney, Agent, or Firm*—Henderson & Strom

[57] ABSTRACT

A process for producing an antibiotic substance, given the name Enocin, is described. The process includes culturing *Streptococcus salivarius* strain K58 until substantial material having antibacterial activity against pantothenate - requiring organisms, including group A streptococci, is produced.

6 Claims, No Drawings

METHOD OF PRODUCING AN ANTIBIOTIC

The invention described herein was made in the course of work under a grant or award from the Department of Health, Education, and Welfare.

BACKGROUND OF THE INVENTION

1. Field of the invention.

This invention relates to a process of preparing an antibiotic substance, and more specifically to a process of preparing such a substance which has inhibitory activity for group A streptococci and other pantothenate - requiring organisms.

The investigation which led to the discovery of Enocin was a study of bacterial interference between the normal pharyngeal flora of man and group A streptococci, a potential human pathogen. In a clinical study designed to evaluate the role of the normal pharyngeal flora of children in prevention of group A streptococcal infection it was found that (1) the presence of certain organisms in the pharyngeal flora was related to resistance of individuals to colonization by group A streptococci and (2) the non-hemolytic streptococci of the normal pharyngeal flora were among the major antagonists of group A streptococcal growth. The mechanism whereby the non-hemolytic streptococcus interfered with the growth of the group A streptococcus was studied further in vitro.

Non-hemolytic streptococci were inoculated into various broth media and incubated. At various time intervals during the growth of the non-hemolytic streptococci aliquots of the culture were removed and cell-free filtrates made by microfiltration. These cell-free filtrates were adjusted to the same pH and redox potential of fresh broth. The ability of adjusted cell-free filtrates to inhibit the growth of group A streptococci was determined by inoculation of group A streptococci directly into the filtrates. After incubation at 37°C in 10% $CO_2$ in air for 18 hours, the growth and/or survival of the group A streptococci in the filtrates was determined by plate counts. Using this direct inoculation procedure, it was observed that cell-free adjusted filtrates made at the end of logarithmic growth of the non-hemolytic streptococci inhibited the growth of group A streptococci. It was further observed that addition of pantothenic acid reversed the inhibition of group A streptococci. The group A streptococci is a pantothenate - requiring organism, and it was thus suggested that other pantothenate - requiring organisms might also be inhibited by Enocin.

The ability of these cell-free filtrates to inhibit the growth of other bacterial species which, like the group A streptococci, require exogenously derived pantothenic acid for growth was tested by the direct inoculation procedure. Pantothenate - requiring organisms tested included: *Streptococcus pyogenes*, group A; *Lactobacillus casei*; *Diplococcus pneumoniae*; *Lactobacillus arabinosus*; non-hemolytic streptococcus; *Proteus morganii*; *Staphylococcus epidermidis*; and enterococcus. The growth of all strains tested was inhibited by these filtrates and this inhibition was either partially or completely reversed by the addition of pantothenic acid to the filtrates. The inhibition observed was primarily bacteriostatic, although some killing of the non-hemolytic streptococcus was also observed.

The ability of cell-free filtrates to inhibit the growth of bacterial strains capable of synthesizing their own pantothenic acid was also determined by the direct inoculation procedure. A ten-fold reduction in growth was observed with all strains tested which included *Staphylococcus aureus*, *Staphylococcus albus*, *Escherichia coli*, *Salmonella*, *Klebsiella*, *Enterobacter*, *Acinetobacter*, *Pseudomonas*, *Proteus mirabilis*, *Proteus vulgaris*, *Proteus rettgeri*, and *Serratia*.

2. Description of the prior art.

The mechanism of inhibitory activity apparently is related to the ability of the antibiotic substance to interfere with the utilization of pantothenic acid, a B vitamin, by bacteria. The importance of pantothenic acid in the intermediary metabolism of bacteria led to the synthesis of many analogs of pantothenic acid in an attempt to produce chemotherapeutic agents. Most of these synthetic analogues, although capable of inhibiting microbial growth, had very high inhibitory ratios in vitro (molar concentration of analogue necessary to inhibit growth/molar concentration of pantothenic acid in the growth medium), thus effective concentrations of these analogues were difficult if not impossible to maintain in vivo. Currently, the only proposed therapeutic use of any pantothenic acid analogue is as an antimalarial agent.

Streptococcal infections, while not normally considered to be a serious hazard, still pose many problems for modern medicine despite improvements in diagnosis and treatment. Infections occur frequently in epidemic proportions among school-aged children and among adults in crowded quarters. Of particular medical concern are the sequellae of streptococcal infections. These are rheumatic fever, which follows infection in approximately 3 percent of cases, and glomerulonephritis, which follows infection in some cases. Various chemotherapeutic regimens are very successful in treating the initial infection and preventing the sequellae. However, they continue to occur due to inappropriate therapy, lack of proper diagnosis, and failure to submit to therapy for mild infections.

There has been a long-standing need for an agent that will prevent and/or treat streptococcal infections.

SUMMARY OF THE INVENTION

According to the present invention, a process is provided for production of an antibiotic substance, referred to herein as Enocin, which has inhibitory activity toward group A streptococci and other micro-organisms which require pantothenic acid for growth.

The process involves preparation of a seed culture of non-hemolytic streptococci obtained from the normal pharyngeal flora, inoculation of the seed culture into a fermentation medium, and incubation of the fermentation medium. The antibiotic substance is made by the micro-organisms during this incubation. The micro-organisms (non-hemolytic streptococci) are removed from the fermentation medium, resulting in an aqueous medium which contains the antibiotic (Enocin) and is free of the micro-organisms which produced it. Adjustment of the pH of the medium to an approximately neutral pH stabilizes the antibiotic. Pantothenic acid, which antagonizes the activity of the antibiotic, may be partially removed by ether extraction. The actual antibiotic substance can be obtained free of other molecules which are much larger or much smaller than the antibiotic by column chromatography.

It is an object of the present invention to provide a novel process for production of an antibiotic substance. It is a further object to provide such a process for production of an antibiotic substance having inhibitory activity against group A streptococci and other pantothenate - requiring organisms.

The foregoing objects as well as additional objects and advantages are attained by the present invention, as will be apparent from the following detailed description.

DESCRIPTION OF THE PREFERRED EMBODIMENT

The antibiotic substance Enocin is prepared, in accordance with the preferred embodiment of the invention, by incubation of non-hemolytic streptococci as described below.

The non-hemolytic streptococcus used herein is identified as Streptococcus salivarius strain K58, and was isolated from the throat flora of a child in a clinical study. An agar overlay technique was devised for screening whole throat flora for inhibitory activity against group A streptococci. A throat swab was placed in 2 milliliters of brain heart infusion broth, vortexed 3 minutes, and a 1:500 dilution in saline was made. Two milliliters of the saline dilution was placed on the surface of a brain heart infusion agar plate, and the excess siphoned off. The brain heart infusion plate was then incubated overnight at 37°C in 10% $CO_2$ in air and inspected for presence of uniform distribution of discrete colonies of the flora. The incubated brain heart infusion agar plate was then replicate plated on a blood agar plate, overlayed with 7.5 milliliters of 20% sheep's blood-brain heart infusion agar and allowed to solidify. A standardized suspension (approximately $5 \times 10^6$ CFU/ml) of group A streptococci, sufficient to completely hemolyze the blood in the overlay layer, was placed on the surface of each plate. The overlay plate and replicate blood agar plate were then incubated overnight at 37°C in 10% $CO_2$ in air.

The incubated overlay plate was then graded in comparison to control plates as to percent of surface area showing inhibition of group A streptococci growth, i.e. no beta hemolysis or surface colonies. The areas of inhibition were then outlined on the top of the overlay plate and colonies of the normal flora present in these areas on the replicate blood agar plate were isolated.

The organism which showed an inhibitory effect toward group A streptococci as described above is identified as Streptococcus salivarius strain K58 , and has the characteristics set forth in the following table:

TABLE 1

Streptococcus salivarius strain K58

I. Microscopic
  gram positive cocci occuring in pairs or chains of pairs
II. Growth in various media at 37°C in 10% $CO_2$ in air
  A. sheep's blood agar: small, smooth, translucent, non-hemolytic colonies
  B. mitis-salivarius agar: dark, slightly raised, smooth colonies, not characteristically mucoid
  C. tryptic soy broth: flocculent growth
III. Growth temperatures
  A. growth at 25°C, 37°C and 45°C
  B. no growth at 4°C
IV. Physiological properties
  A. catalase: negative
  B. final pH in glucose broth: 4.0
  C. growth in 6.5 percent NaCl - broth: negative
  D. gelatin liquification: negative
  E. ammonia produced from arginine: negative
  F. sugar fermentations
    1. fermentation of
      glucose
      maltose
      lactose
      sucrose
      salicin
    2. No fermentation of
      mannitol
      sorbitol
V. Serology
  sergogroups as Lancefield's group K The characteristics as set forth in Table 1 identify strain K58 as a Streptococcus salivarius. The sole variation from the classical description of this genus-species is noted in II B of Table 1. Antibiotic Antibiotic susceptibilities showed this organism to be sensitive to methicillin, ampicillin, carbenicillin, cephalothin, penicillin and lincomycin and resistant to tetracycline, polymyxin B, erythromycin, gentamicin, streptomycin and kanamycin. The minimal inhibitory concentration of tetracycline against this organism as determined by a serial two-fold dilution technique was 200 micrograms per milliliter.

Attempts were made to serogroup Streptococcus salivarius strain K58 by a precipitation technique using group specific antisera. Results revealed that it did not belong to Lancefield's group A, B, C, D, F or G and that it is group K. These characteristics firmly identified the organism as a non-hemolytic streptococcus not belonging to Lancefield's serogroup D, the enterococci. This organism was chosen for further study not only because of its inhibitory activity against the group A streptococci but also because of its antibiotic susceptibility pattern. If artificial colonization of non-hemolytic streptococci in the pharynx was ever proposed as a method to increase resistance to streptococcal disease, the antibiotic susceptibilities of this organism make it advantageous for use as an "interfering" strain for several reasons. First, if antibiotic suppression of the normal flora was required before colonization could be affected, the high resistance of the strain to tetracycline would be advantageous. Also, the sensitivity of the strain to penicillin would allow its elimination from the pharynx if complications arose from colonization.

A culture of the above-identified organism Streptococcus salivarius strain K58 has been deposited at the American Type Culture Collection (ATCC), Rockville, Md., and has been assigned ATCC No. 31067.

The production of the antibiotic substance Enocin in accordance with the invention involves, broadly, incubation of non-hemolytic streptococci in a suitable medium, preferably until the logarithmic growth phase has ended.

The fermentation medium can be any medium providing an assimilable source of carbon and nitrogen, and essential minerals, in which non-hemolytic streptococci can grow. Examples are trypticase soy broth and pantothenate assay medium containing added pantothenic acid. Generally, but not necessarily, the same medium used for seed cultures is used for the fermentation medium. One particularly good medium is pantothenate assay medium with $5.0 \times 10^{-6}$ mg/ml pantothenic acid.

EXAMPLE 1

This example illustrates a preferred manner for preparing a seed culture for use in producing Enocin.

Several colonies of non-hemolytic streptococci were removed from the surface of a blood agar plate and inoculated into a tube containing pantothenate assay medium to which $5.0 \times 10^{-6}$ mg/ml pathothenic acid had been added. The tube was incubated about 18 hours at 37°C in 10% $CO_2$ in air. The culture was then centrifuged for ten minutes at 7,000 rpm to pack the bacterial cells in the bottom of the tube. The supernatant liquid was poured off, and the cellular material resuspended in a sufficient volume of 0.85 percent NaCl to give a suspension having an optical density of 0.4 at 450 nm. The suspension was then diluted 1:10 in saline.

EXAMPLE 2

This example illustrates the inoculation of a fermentation medium with the seed culture prepared as in Example 1, and incubation of same.

The final suspension from Example 1 (5 ml) was used to inoculate 500 ml of an identical fermentation medium. The resulting bacterial population in the medium was $1-3 \times 10^4$ CFU/ml. The medium was then incubated at 37°C, in 10% $CO_2$ in air, for 7 to 8 hours. The organism reaches the end of its logarithmic growth phase by this time at these conditions. The Enocin is produced during this incubation. An aqueous solution containing Enocin, free of the antibiotic-producing organism, may be obtained by centrifugation to pack the cellular material followed by filtration of the supernatant fluid through a 0.45 micron filter.

The resulting aqueous solution containing the Enocin is preferably stabilized by adjusting the pH thereof to 7.2 by addition of 1 N NaOH. The solution preferably is extracted with ether to remove pantothenic acid. Enocin in a partially purified form may be obtained from the extracted aqueous phase by column chromatography.

The foregoing examples illustrate the most preferred manner of producing Enocin in accordance with the invention. Many variations and modifications may be used within the broader scope of the invention. For example, other media may be used to prepare the seed culture and/or for the fermentation. The seed cultures may be incubated from 6 to 24 hours, more or less, and a different concentration of organism may be used in the fermentation, and the fermentation conditions may be varied. Enocin is present in the fermentation medium in less than 6 hours, and after as much as 30 days, but the activity per ml of fermentation medium is greatest when the fermentation is conducted for 6 to 12 hours. Other minor variations will be apparent to those skilled in the art.

While Enocin has not been recovered in pure form, certain physical properties of the material have been determined. Cell-free filtrates produced as set forth in the above examples and containing Enocin were subjected to physical and chemical treatments in an attempt to modify its inhibitory activity. Treatments showing no effect on inhibitory activity included storing filtrates at 4°C for 1 month, leaving filtrates at room temperature, 37°C and 56°C for 1 hour, lowering the pH to 2.0 for 1 hour, and raising the pH to 14.0 for 1 hour. The following treatments partially destroyed the inhibitory activity of filtrates: storage of 4°C for 2 months, autoclaving for 15 minutes at 252°F under 15 psi, boiling for 15 minutes and autoclaving at pH 2.0 for 15 minutes at 252°F under 15 psi.

A biological assay for Enocin was divised as follows: the material to be tested for the presence of Enocin was serially two-fold diluted into pantothenate assay media containing $0.04 \times 10^{-6}$ mg/ml pantothenate. This concentration was chosen because it did not reverse the inhibitory activity of cell-free filtrates. Each tube was then inoculated with non-hemolytic streptococci to yield a bacterial population of 1 to $3 \times 10^4$ CFU/ml, and incubated for 18 hours. The inhibitory titer was expressed as the reciprocal of the highest dilution of test material which prevented macroscopic growth. Using this assay system it was found that Enocin was not removed from filtrates by (1) ether extraction, (2) $CaCl_2$ precipitation, (3) trypsin digestion or (4) filtration through membranes or hollow fiber devices designed to exclude solutes of greater than 1,000 molecular weight. Column chromatography with Sephadex G-25, fine grade, showed Enocin to elute at a volume slightly larger than pantothenic acid and at a volume less than NaCl suggesting a molecular weight of less than 200.

Several studies were designed to evaluate the mechanism of action of Enocin. Solutions of pantothenic acid were added to cell-free filtrates and pantothenate free medium.

The growth of a non-hemolytic streptococcus (sensitive to Enocin) in each medium after 18 hours incubation was taken as an index of the "availability for growth" of the added pantothenate. When 2.0 to 10.0 $\times 10^{-7}$ mg/ml pantothenate was added to filtrates only half appeared to be utilized for "growth", (and/or survival). When $20.0 \times 10^{-7}$ mg/ml pantothenate was added, growth was 85% greater than expected. This suggested that Enocin was in some way interfering with the utilization of pantothenic acid. The removal of $C^{14}$ pantothenate from the growth medium (cellular uptake) by non-hemolytic streptococci was assayed in the presence and absence of Enocin. Although removal of $C^{14}$ pantothenate from the growth medium proceeded at a slower rate in the presence of Enocin, growth also proceeded at a slower rate, and the cell associated $C^{14}$ pantothenate (in mg/CFU) was higher in the presence of Enocin. These results suggested that Enocin did not interfere with the utilization of pantothenate by blocking the transport of the vitamin into the cells.

Susceptible cells were preincubated in pantothenate-rich medium, washed, and then inoculated into Enocin-containing medium. Such preincubation afforded the cells some protection from inhibition by Enocin, this protection being greater with high concentrations of pantothenate in the preincubation medium. These results suggested that Enocin could not totally displace pre-existing pantothenate in the cells.

Enocin did not appear to chemically or physically react with pantothenate when the two substances were allowed to mix in solution for 2 hours at 37°C in 10% $CO_2$ in air. This was indicated by demonstration of identical elution patterns from a Sephadex G-25 column when the substances were applied both separately and together after the 2 hour mixing. The results of these studies indicated that Enocin may function as an antimetabolite of pantothenic acid and its small size suggests that it may be an analogue of the vitamin.

Aqueous solutions containing Enocin and prepared in accordance with Example 2 were determined to be capable of inhibiting the growth of group A streptococci. The Enocin-containing solutions were inoculated directly with group A streptococci. After incubation at 37°C in 10% $CO_2$ in air for 18 hours, the growth and/or survival of the group A streptococci was determined by plate counts. Using this direct inoculation procedure, it was observed that Enocin-containing solutions obtained at the end of the logarithmic growth of non-hemolytic streptococci inhibited the growth of group A streptococci.

We claim:

1. A process for producing the antibiotic substance Enocin having antibacterial activity against group A streptococci and other pantothenate - requiring organisms comprising cultivating *Streptococci salivarius* strain K58 (ATCC No. 31067) in an aqueous growth medium until a substantial amount of Enocin is produced, and recovering the Enocin from said growth medium.

2. The process of claim 1 wherein the growth medium is pantothenate assay medium having pantothenic acid added thereto.

3. The process of claim 2 wherein the organism is cultivated until the end of the logarithmic growth phase.

4. The process of claim 1 wherein the cellular material is removed from the fermentation medium after production of the Enocin, providing a fluid containing the Enocin.

5. The process of claim 4 wherein the fluid containing the Enocin is extracted with ether to remove pantothenic acid.

6. The process of claim 5 wherein the fluid, after extraction with ether, is passed through a chromatograph column to provide partially purified Enocin.

* * * * *